United States Patent [19]
Iwata et al.

[11] Patent Number: 5,931,267
[45] Date of Patent: Aug. 3, 1999

[54] DISC BRAKE

[75] Inventors: Yukio Iwata; Yutaka Nakagawa; Shinji Aoyagi; Masami Takebayashi, all of Saitama, Japan

[73] Assignee: Akebono Brake Industry Co., Ltd., Tokyo, Japan

[21] Appl. No.: 08/815,919

[22] Filed: Mar. 13, 1997

[30] Foreign Application Priority Data

Mar. 15, 1996 [JP] Japan .................................. 8-087533

[51] Int. Cl.$^6$ .................................................. F16D 65/14
[52] U.S. Cl. ..................... 188/73.45; 188/73.44
[58] Field of Search ............................. 188/73.44, 73.45, 188/72.4, 73.31, 73.39, 73.41, 73.42, 73.43

[56] References Cited

U.S. PATENT DOCUMENTS

| | | | |
|---|---|---|---|
| 3,388,774 | 6/1968 | Burnett ................................ | 188/73.45 |
| 4,049,086 | 9/1977 | Rath .................................... | 188/73.45 |
| 4,061,209 | 12/1977 | Gee et al. ............................ | 188/73.45 |
| 4,068,745 | 1/1978 | Haraikawa .......................... | 188/73.45 |
| 4,274,514 | 6/1981 | DuCharme et al. ................. | 188/73.45 |
| 4,372,428 | 2/1983 | Delaunay et al. ................... | 188/73.45 |
| 4,373,616 | 2/1983 | Kondo ................................. | 188/73.45 |
| 4,446,947 | 5/1984 | Le Deit ............................... | 188/73.45 |
| 4,574,923 | 3/1986 | Nakajima et al. ................... | 188/73.45 |
| 4,781,273 | 11/1988 | Fujinami ............................. | 188/73.45 |
| 5,526,904 | 6/1996 | Walden et al. ...................... | 188/73.45 |
| 5,749,445 | 5/1998 | Ruiz Busquets .................... | 188/73.44 |

FOREIGN PATENT DOCUMENTS

| | | |
|---|---|---|
| 2 341 780 | 9/1977 | France . |
| 0099526 | 6/1983 | Japan .................................. 188/73.44 |
| 1 563 818 | 4/1980 | United Kingdom . |
| 2 199 908 | 7/1988 | United Kingdom . |
| 2 199 909 | 7/1988 | United Kingdom . |
| WO 95/18928 | 7/1995 | WIPO . |

*Primary Examiner*—Chris Schwartz
*Attorney, Agent, or Firm*—Morgan, Lewis & Bockius LLP

[57] ABSTRACT

A slide guide mechanism consisting of guide holes and guide pins inserted into the guide holes, is used to mount a caliper on a support member, which is attached to a vehicle, such that the caliper is able to move in the axial direction of a rotor. The caliper has a fluid pressure means pressing an inner pad and an outer pad against the rotor during braking. Braking torque generated by the inner pad is transmitted to the support member. Braking torque generated by the outer pad is transmitted to the support member through the caliper and the slide guide mechanism. The main guide pin 16 is located at a position from where a gap from the guide hole of the slide guide mechanism is smaller, the guide hole for the main guide pin 16 is long enough to cross over the rotor and reach the outer pad, and the main guide pin 16 is located on the rotor run-out side. Moreover, the positions of the guide pins are located in a radial direction of the rotor, beyond the location where the outer pad is attached to the caliper.

22 Claims, 5 Drawing Sheets

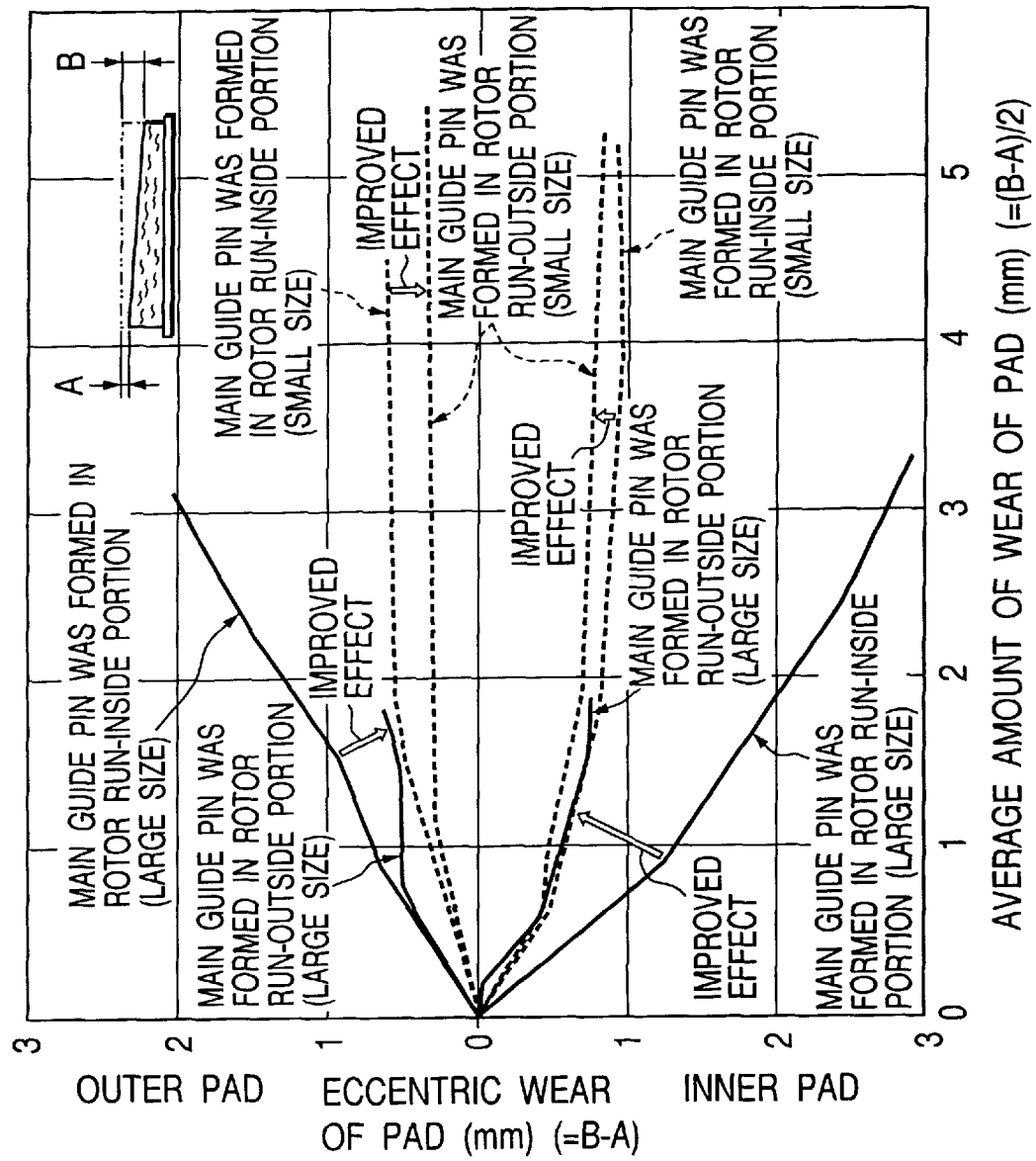

DISC BRAKE

BACKGROUND OF THE INVENTION

1. Field of the Present Invention

The present invention relates to the field of disc brakes, and more particularly to an automotive disc with reduced noise, reduced vibration and less eccentric wear on the brake pads.

2. Discussion of the Related Art

Previously, a disc brake has been described having a structure where a braking torque generated by an outer pad is transmitted to a stationary portion of a vehicle through a caliper, and the braking torque of an inner pad is transmitted to a support member, as disclosed, for example, in Japanese Utility Model Publication No. 62-130233. As shown in FIGS. 5A and 5B, such a disc brake has a caliper 2, which is positioned around a rotor 1. The caliper 2 is movable with respect to a support member 3 in an axial direction of the rotor 1 through a pair of guide pins 4 and 5. A hydraulic cylinder mounted on the inner side of the caliper 2 is operated to press the inner pad 6 against the rotor 1. When the caliper 2 is moved by the reaction force of the rotor 1 during a pressing operation, a claw 7 on the outer side of the caliper 2 presses the outer pad 8 against the rotor 1. In this case, the outer pad 8 is connected to the caliper claw 7 by a projection and recess engagement 9, so that the braking torque of the outer pad 8 is transmitted to the caliper claw 7.

In this disc brake, the braking torque of the inner pad 6 is transmitted to the support member 3. The braking torque of the outer pad 8 is transmitted to the rotor run-in side guide pin 4 through the caliper claw 7, and then to the body of the vehicle. Therefore, in a conventional structure the guide pin arrangement consists of a large-diameter main guide pin 4 on the rotor run-in side portion, and a sub-guide pin 5 on the rotor run-out side portion with a small diameter so as to allow for manufacturing tolerances. Moreover, the braking torque of the outer pad 8 is transmitted through the main guide pin 4 having a large diameter.

The braking torque of the outer pad 8 is transmitted to the caliper 2 which can move in the axial direction of the rotor 1. The caliper 2 has an arm which extends from the side of the caliper 2 to face the support member 3 at a position in the stationary portion of the vehicle. The guide pin 5 is attached to the support member, and is inserted through the caliper arm. The guide pin 5 is located on the inner side of the rotor 1, and the caliper 2, supported by the guide pin 5, holds the outer pad 8 using the claw 7, which extends to the outer side of the rotor 1.

Therefore, when the outer pad 8 is pressed against the rotor 1, it generates a moment M for counterclockwise rotation of the outer pad 8, as shown in FIGS. 5A and 5B, such that the main guide pin 4 serves as the base point. Thus, the overall body of the caliper 2 is deformed, and the inner pad 6 and the outer pad 8 are not pressed against the rotor 1 in parallel. This causes eccentric wear of the inner pad 6 and the outer pad 8.

When the braking torque is generated, the main guide pin 4 transmits the torque to the support member 3. Although a rubber bushing is mounted on the smaller-diameter sub-guide pin 5, the rubber bushing can become deformed when the braking torque is generated. Therefore, the caliper 2 and the support member 3 vibrate due to the generation of the moment M. This, in turn, causes noise.

SUMMARY OF THE INVENTION

Accordingly, the present invention is directed to a disc brake that substantially obviates one or more of the problems due to the limitations and disadvantages of the related art.

One object of the present invention is to provide a disc brake which avoids generation of planar moment in the caliper so as to prevent eccentric wear of the pads.

Another object of the present invention is to provide a disc brake whose torque is transmitted primarily through the main guide pin, and a part of the braking torque is also transmitted through the sub-guide pin during braking, so that vibrations of the caliper and the support member are prevented, and noise is eliminated.

In one aspect of the present invention, there is provided a disc brake including a rotor having an inner side, an outer side and an edge, an inner brake pad and an outer brake pad, a support member for attaching the disk brake to a vehicle, the support member having a main guide pin guide hole and a sub-guide pin guide hole, a caliper mounted on the support member, the caliper having a claw and a caliper arm, the outer brake pad having a pair of engagement projections for aligning with engagement holes in the claw, a main guide pin attached to the caliper arm, inserted into the main guide pin guide hole and positioned beyond the edge of the rotor, a sub-guide pin attached to the caliper arm, inserted into the sub-guide pin guide hole and positioned beyond the edge of the rotor, wherein a line connecting a center of the main guide pin and a center of the sub-guide pin is perpendicular to a radial direction of the rotor, and is parallel to and further away from a center of the rotor than a line connecting centers of the pair of the engagement holes, wherein the caliper is constrained to move in an axial direction of the rotor by the main guide pin and the sub-guide pin, and a force means for moving the caliper in the axial direction, whereby the caliper presses the inner brake pad against the inner side of the rotor, and the caliper claw presses the outer brake pad against the outer side of the rotor.

In another aspect of the present invention, there is provided a disc brake including a rotor having an inner side, an outer side and an edge, a support member for attaching the disk brake to a vehicle, the support member having a main guide pin and a sub-guide pin attached to it, a caliper mounted on the support member, the caliper having a claw and a caliper arm, the caliper arm having a main guide pin guide hole and a sub-guide pin guide hole, wherein the main guide pin is inserted into the main guide pin guide hole and positioned beyond the edge of the rotor, wherein the sub-guide pin attached inserted into the sub-guide pin guide hole and positioned beyond the edge of the rotor, wherein a line connecting a center of the main guide pin and a center of the sub-guide pin is perpendicular to a radial direction of the rotor, and is parallel to and further away from a center of the rotor than a line connecting centers of the pair of the engagement holes, wherein the caliper is constrained to move in an axial direction of the rotor by the main guide pin and the sub-guide pin, an inner brake pad and an outer brake pad, the outer brake pad having a pair of engagement projections for aligning with engagement holes in the claw, and a force means for moving the caliper in the axial direction, whereby the caliper presses the inner brake pad against the inner side of the rotor, and the caliper claw presses the outer brake pad against the outer side of the rotor.

In another aspect of the present invention, there is provided a disc brake including a support member attached to a vehicle axially inward of a rotor, a caliper mounted on the support member, a slide guide mechanism between the caliper and the support member, the slide guide mechanism including a main guide pin guide hole and a sub-guide pin guide hole, and a main guide pin and a sub-guide pin arranged to be received by the respective guide holes, the slide guide mechanism allowing the caliper to move in an axial direction with respect to the rotor, the caliper having fluid pressure means which enables operation of an axially inner pad and an axially outer pad to grip the rotor, wherein a braking torque generated by the inner pad is supported by the support member and braking torque generated by the outer pad is transmitted to the support member through the caliper and the slide guide mechanism, wherein a gap between a surface of the main guide pin and the main guide pin guide hole is smaller than a gap between a surface of the sub-guide pin and the sub-guide pin guide hole, wherein the main guide pin is positioned on the rotor run-out side of the slide guide mechanism, and wherein main guide pin extends through the plane of contact of the axially outer pad and the rotor.

It is to be understood that both the foregoing general description and the following detailed description are exemplary and explanatory and are intended to provide further explanation of the invention as claimed.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

BRIEF DESCRIPTION OF THE DRAWINGS

The accompanying drawings, which are included to provide a further understanding of the invention and are incorporated in and constitute part of this specification, illustrate embodiments of the invention and together with the description serve to explain the principles of the invention.

In the drawings:

FIG. 4 is a graph showing the improvements in the amount of eccentric wear;

DETAILED DESCRIPTION OF THE PREFERRED EMBODIMENTS

Reference will now be made in detail to the preferred embodiments of the present invention, examples of which are illustrated in the accompanying drawings.

Figure 1:
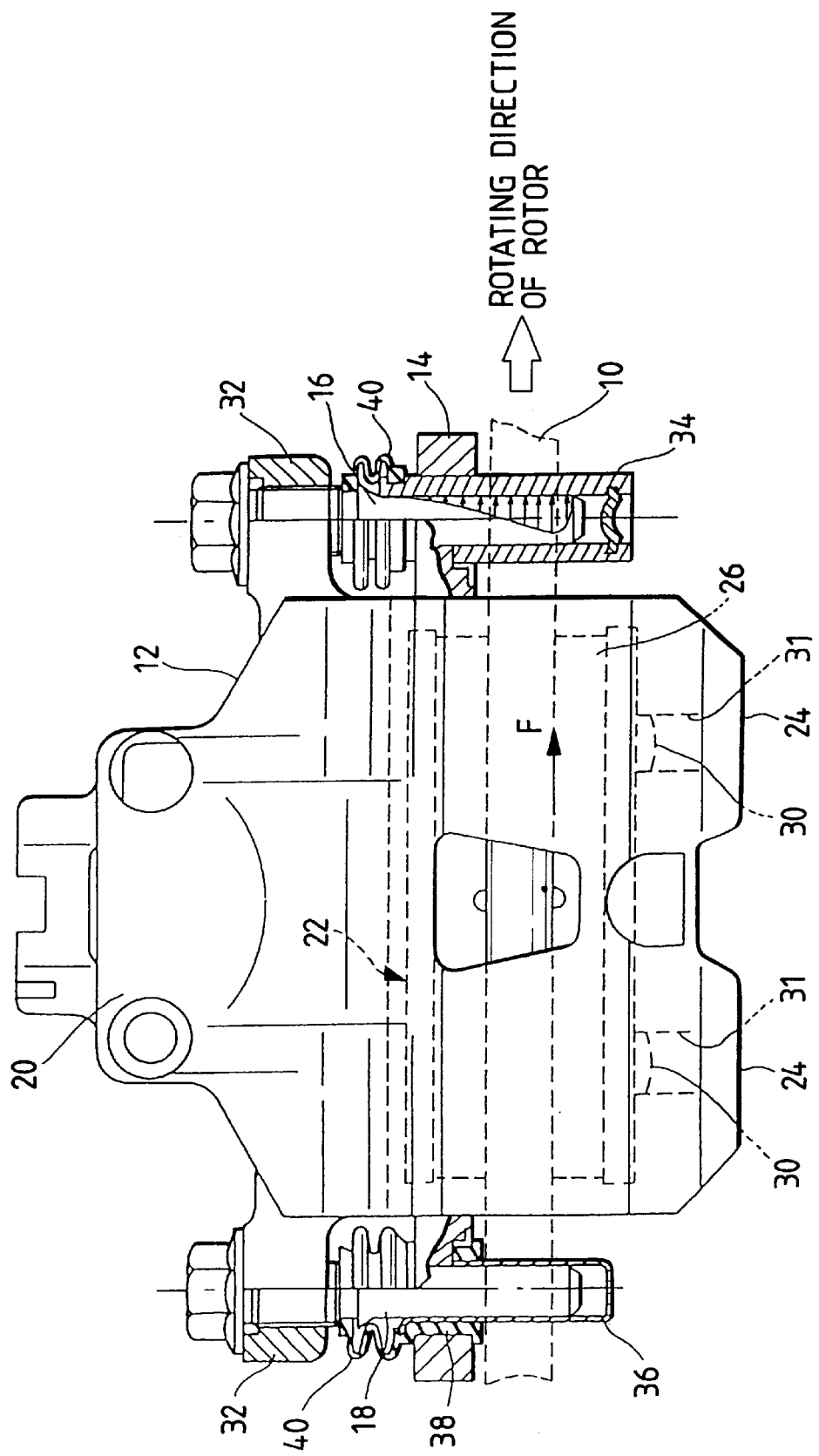
FIG. 1 is a plan view showing a disc brake according to a first embodiment of the present invention.
Figure 2:
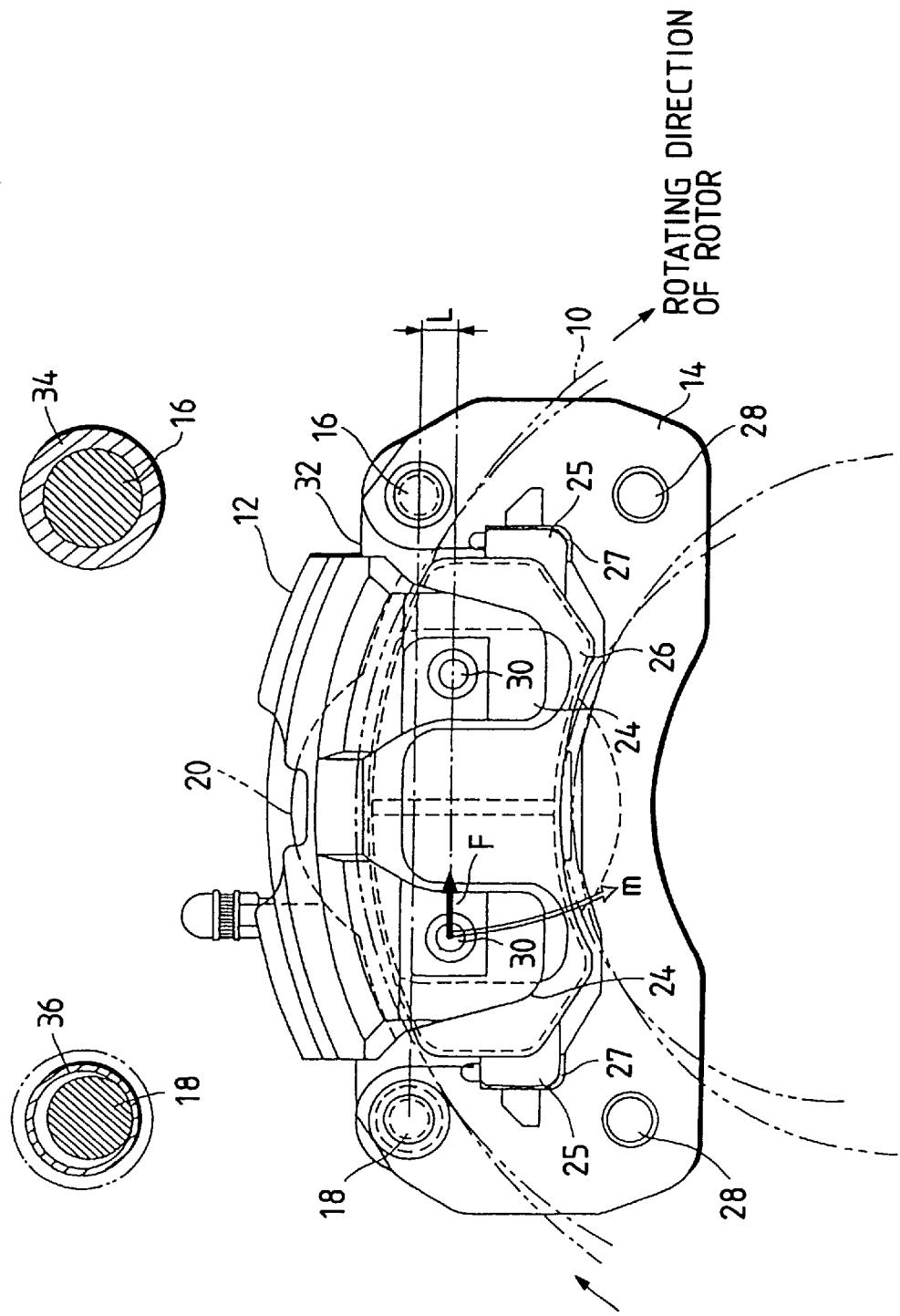
FIG. 2 is a front view showing the disc brake of FIG. 1.

FIGS. 1 and 2 are a front view and a plan view of a disc brake according to a first embodiment of the present invention. As shown in FIGS. 1 and 2, the disc brake of this embodiment has a caliper 12 positioned around a rotor 10. A pair of guide pins 16 and 18 are arranged in parallel, and are movable in an axial direction of the rotor 10 with respect to a support member 14, which is attached to the car body. This allows for axial movement of the caliper 12. A hydraulic cylinder 20 is mounted on an inner side of the caliper 12 and can apply a force to an inner pad 22 to press the inner pad 22 against the rotor 10. When the caliper 12 has been moved by a reaction force from the pressed inner pad 22, a caliper claw 24, which is in contact with the outer side of an outer pad 26, presses the outer pad 26 against the rotor 10.

A support member 14, which is secured to the body of the vehicle by screws (not shown) passing through screw holes 28, is located opposite the inner surface of the rotor 10 and closer to a center of the rotor 10 than the locations where guide pins 16 and 18 are inserted into the slide sleeves 34 and 36. Guide pins 16 and 18 are located beyond an outer periphery of the rotor 10. Thief inner pad 22 is mounted on the support member 14 and is able to move in the axial direction of the rotor 10. Thus, the support member 14 can transmit the rotational torque generated by the braking to the vehicle.

The support structure includes projections 25 formed on the two side ends of the inner pad 22, and recess grooves 27 formed along the axial direction of the rotor 10 corresponding to the support member 14, thus forming an anchoring mechanism utilizing the engaged projections 25 and the recess grooves 27. When a hydraulic cylinder 20 of the caliper 12 is operated, the inner pad 22 is pressed against the rotor 10 while being guided by the engaged projections 25 and the recess grooves 27. When the inner pad 22 follows the rotor 10 and rotates, the engaged projections 25 and recess grooves 27 serve as an anchor restraining the movement of the caliper 12 when the braking torque is generated.

At the same time, the caliper 12 moves toward the inner side of the rotor 10 along the axial direction of the rotor 10 while being guided by the guide pins 16 and 18, and presses the outer pad 26 against the rotor 10 through the caliper claw 24. The braking torque of the outer pad 26 is transmitted to the caliper 12. Therefore, engagement projections 30 on the rear side of the outer pad 26 are engaged. The caliper claw 24 has engagement holes 31 into which the engagement projections 30 are inserted. The caliper claw 24 is branched into two sections, and each section of the claw 24 is engaged. Therefore, when the outer pad 26 is pressed against the rotor 10 generating the braking torque, the torque is transmitted to the caliper 12 through the engagement projections 30, and then to the support member 14 through a rotor run-out side main guide pin 16.

It is preferable for the guide pins 16 and 18 to be oriented in an axial direction of the rotor 10, and located beyond the location where the outer pad 26 is attached to the caliper 12.

As shown in FIGS. 1 and 2, the main guide pin 16 on the rotor run-out side has a larger diameter, and the sub-guide pin 18 on the rotor run-in side has a smaller diameter. The guide pins 16 and 18 are attached to the caliper 12. A caliper arm 32 extending in the right and left directions (i.e. along the surface of the rotor 10) is located on the inner side of the caliper 12. The guide pins 16 and 18 are clamped and secured to stand erect on the caliper arm 32. In particular, head portions of the guide pins 16 and 18 are secured to the caliper arm 32, and then inserted into the support member 14 so as to extend to the outer side over the rotor 10 in order to reach the contact surface between the rotor 10 and the outer pad 26.

The support member 14, into which the guide pins 16 and 18 are inserted, has the slide sleeves 34 and 36 each having a pin slide guide hole. The slide sleeve 34 on the rotor run-out side, through which the main guide pin 16 is inserted, has a larger diameter than the sub-guide pin 18. The braking torque of the outer pad 26 is transmitted to the main guide pin 16 through the caliper 12 through the inner slide surface of the slide sleeve 34 and then to the support member 14. The part of the surface of the slide sleeve 34 which transmits the braking torque is mainly the half portion of the slide sleeve 34 on the rotor run-out side. In particular, the braking torque generated on the outer surface portion of the rotor 10 is transmitted. The slide sleeve 36, located on the rotor run-in side and having the sub-guide pin 18 inside it, has a diameter larger than the slide sleeve 34. The guide pin 18 has a diameter smaller than the main guide pin 16. A rubber bushing 38, mounted to secure the slide sleeve 36 to the support member 14, is capable of absorbing deformation of the caliper 12. Rubber boots 40 are attached to the neck portions of the guide pins 16 and 18 around the exposed open portions of the slide sleeves 34 and 36, enabling waterproofing and dust proofing.

The guide pins 16 and 18, as shown in FIG. 2, are located beyond the outer periphery of the rotor 10, and are positioned so that the line connecting the centers of the pair of the guide pins 16 and 18 is located beyond the line connecting the pair of the engagement holes 31 (where "beyond" means further away from the center axis of the rotor 10). A pair of pad engagement portions of the caliper claw 24 are formed along the chord of the rotor 10. The line connecting the guide pins 16 and 18 is parallel to the line connecting engagement holes 31. Thus, an offset of a distance L is created between the two lines, between the point where the outer pad 26 is attached to the caliper 12 and the center for transmitting the braking torque through the main guide pin 16 (i.e., L is a moment arm). As a result, an outer side braking force F, which acts during the braking operation, generates a moment m which presses the rotor run-in side portion of the caliper 12 against the center portion of the rotor 10, causing a rotation of the caliper's run-in side portion. Thus, the moment m acts on the sub-guide pin 18 through the caliper arm 32 on the rotor run-in side portion so that a pressing force acts on the rubber bushing 38 (see FIG. 2 showing a cross-sectional view of the guide pins 16 and 18). In other words, with the moment m vector at the engagement projection 30 as shown, the left side of the caliper 12 tends to rotate into the page, thus pressing the left side of the outer brake pad 26 against the rotor 10 with additional force and compensating for the fact the run-in side of the outer brake pad 26 would normally be pressed against the rotor 10 with less force than the run-out side of the brake pad 26. This results in a more even pressing of the outer brake pad 26 against the rotor 10, and avoids eccentric wear of the outer brake pad 26.

In the embodiment above, the inner pad 22 is pressed against the rotor 10 during braking. Also, the caliper 12 presses the outer pad 26 against the rotor 10, generating a reaction force. The braking torque of the caliper 12 is transmitted directly to the support member 14, while the braking torque of the outer pad 26 is transmitted to the main guide pin 16 through the caliper claw 24. Thus, the torque is transmitted to the support member 14 from the leading edge of the main guide pin 16, as shown in FIG. 1, which shows a force F in the direction of the main guide pin 16. In this case, the maximum torque is received along an extension line of the contact surface between the outer pad 26 and the surface of the rotor 10. Therefore, even if the caliper 12 is deformed due to the braking torque transmitted from the outer pad 26 (such that the caliper 12 exerts a force against the main guide pin 16), the force acting on the main guide pin 16 is in the direction of the line of the force F acting from the rotor 10 on the outer pad 26. As a result, the force rotating the caliper 12 can be reduced. Since the main guide pin 16 is long enough to reach the outer surface of the rotor 10, and both guide pins 16 and 18 are located beyond the braking center of the outer pad 26 in the radial direction of the rotor 10, the sub-guide pin 18 is pressed against the sleeve mainly at the inner surface of the slide sleeve 36 closest to the main guide pin 16. In other words, the outer pad 26 and the surface of the rotor 10 come into contact in a plane of contact that includes the arrow F in FIG. 2. The main guide pin 16 is long enough to extend through the plane of contact. Thus, with less free space available for the guide pins 16 and 18, vibration is reduced. Such a structure is also effective in preventing noise and eccentric wear of the pads 22 and 26. In the radial direction of the rotor 10, the centroid of the outer pad 26 substantially coincides with a portion in which the outer pad 26 is attached to the caliper 12.

Figure 3:
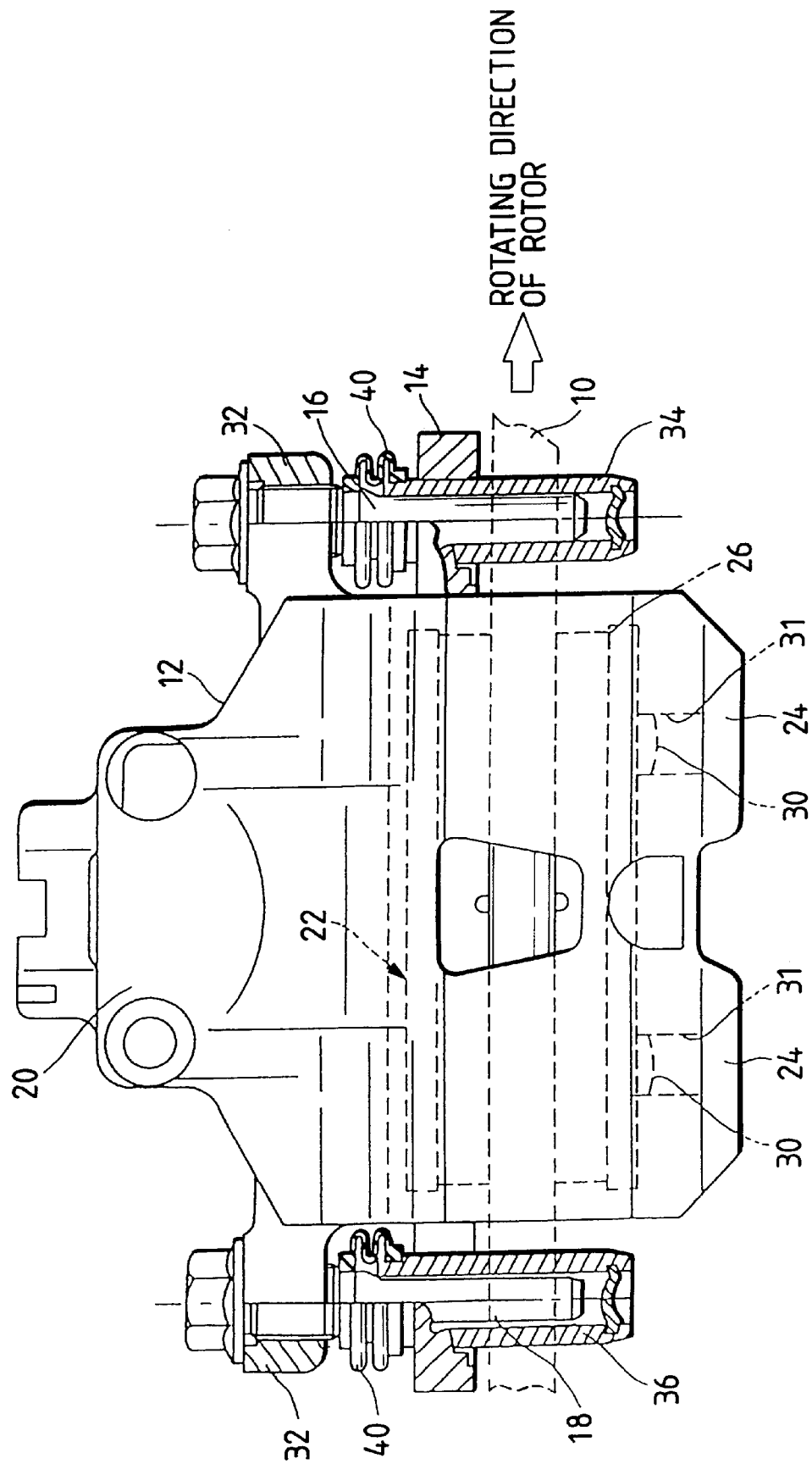
FIG. 3 is a plan view showing a disc brake according to a second embodiment of the present invention.
Figure 5A:
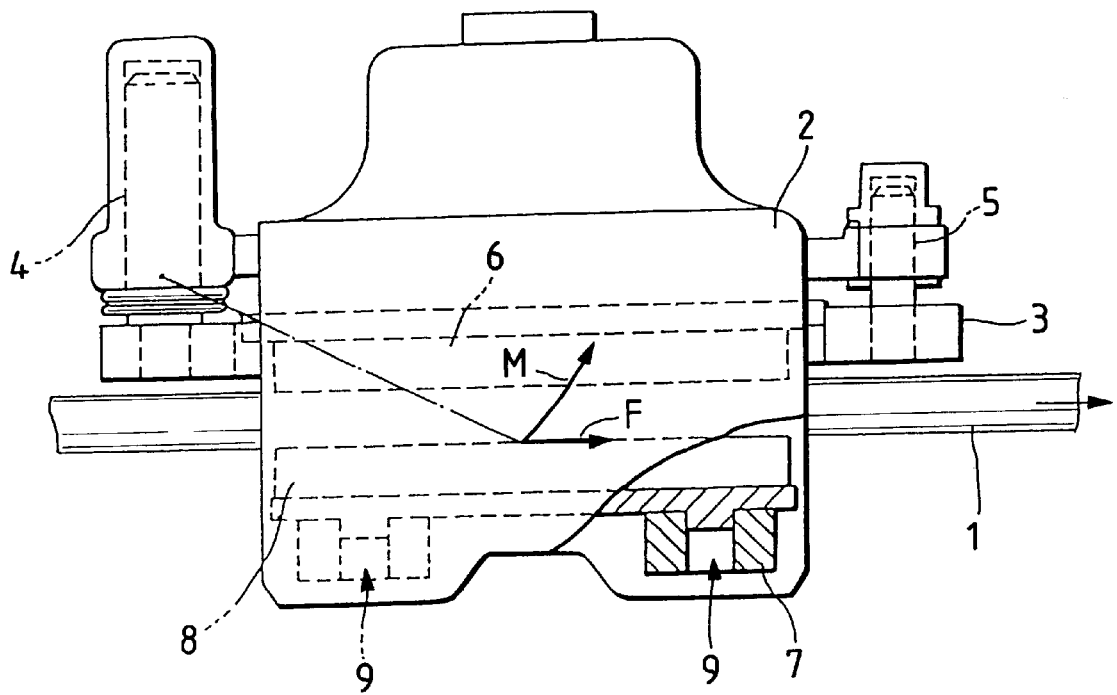
FIG. 5A is a plan view of a conventional disc brake.
Figure 5B:
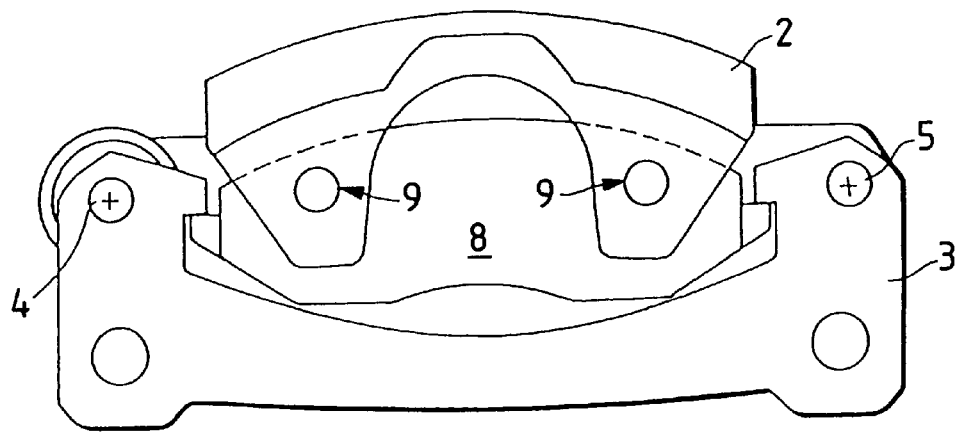
FIG. 5B is a front view of the conventional disc brake of FIG. 5A.

FIG. 3 shows another embodiment, having the sub-guide pin 18 located on the rotor run-in side portion inside the slide sleeve 36 with a clearance between the sub-guide pin 18 and the inner surface of the slide sleeve 36. The slide sleeve 36 has a surface similar to the surface of sleeve 34 and has a large diameter. If necessary, a rubber bushing 38 may be mounted around the leading end of the sub-guide pin 18. The other structures are formed similarly to those of the embodiment shown in FIGS. 1 and 2.

FIG. 4 shows how the present invention prevents eccentric wear of the pads 22 and 26 in the circumferential direction of the rotor 10. A large size disc brake (continuous line) and a small size disc brake (dashed line) were evaluated, and the amount of eccentric wear in the circumferential direction of the rotor 10 was measured in a case where the average amount of wear increased as time elapsed. This wear was measured for cases when the main guide pin 16 was located on the rotor run-in side portion as well as on the rotor run-out side portion. As shown in FIG. 4, eccentric wear can be prevented when the main guide pin 16 is located on the rotor run-out side portion regardless of whether the pad is the outer pad 26 or the inner pad 22, or whether the size is large or small.

Although in the above-mentioned embodiment, the sub-guide pin 18 has the same length as that of the main guide pin 16, the sub-guide pin 18 may be shorter than the main guide pin 16, as is commonly used in practice. Also, although the support member 14 may have a cylindrical sleeve press fit into the plate member, the structure is not limited to this. For example, the support member 14 may be integrally cast. Also, although the slide guide mechanism has been described with the guide hole in the support member 14 and the guide pins 16 and 18 in the caliper 12, the guide pins 16 or 18 may also be attached to the support member 14 and the guide hole located in the caliper 12.

As described above, the main guide pin 16, which has almost no clearance between it and the slide sleeve 34, and which receives the braking torque, is long enough to cross over the rotor 10 and reach the slide surface of the outer pad 26. Moreover, the main guide pin 16 is located on the rotor run-out side. Therefore, such a structure prevents eccentric wear of the inner pad 22 and the outer pad 26. Since the main guide pin 16 is beyond the center of the outer braking force, the movement of the caliper 12 along the surface of the rotor 10 is stabilized. Thus, moment is generated mainly in the main guide pin 16, causing the caliper 12 to move to the center of the rotor 10. As a result, the two guide pins 16 and 18 are pressed against the slide sleeves 34 and 36, preventing vibrations. This results in a disc brake which eliminates noise and prevents eccentric wear.

In the embodiments described above, when a braking torque is generated in the outer pad 26, the braking torque from the outer pad 26 is transmitted to the main guide pin 16 through the caliper 12 (which is located on the rotor run-out side), and then transmitted to the support member 14 through the surface of the guide hole which has the main guide pin 16 inserted through it. Since the main guide pin 16 and the guide hole are long enough to cross over the rotor 10 and reach the surface where the outer pad 26 and the rotor 10 are pressed together during braking the point of application of the braking torque and the bearing point along the axial direction of the rotor 10 are the same. Thus, so-called offset can be prevented. Therefore, even if torsional torque is generated by the braking operation when the caliper's 12 outer portion presses against the main guide pin 16, the overall surface of the main guide pin 16 is able to bear the torque on the extension line of force acting from the rotor 10 onto the outer pad 26. Moreover, the force which generates the planar moment can be reduced. As a result, the movement of the caliper 12 is smoother, and eccentric wear of the pads 22 and 26 can be avoided.

Since the main guide pin 16 is located beyond the portion in which the outer pad 26 is attached to the caliper 12 in the radial direction of the rotor 10, the braking torque of the outer pad 26 generates moment of rotation, which rotates the portion of the caliper 12 next to the sub-guide pin along the surface of the rotor 10, such that the main guide pin 16 serves as the center of rotation. Therefore, the braking torque generates a force which presses the caliper 12 against the sub-guide pin 18. Thus, the sub-guide pin 18 is brought into close contact with the slide sleeve within which the sub-guide pin 18 is inserted, eliminating the possibility of free movement of the sub-guide pin 18. As a result, vibrations between the caliper 12 and the support member 14 can be reduced, and noise can be eliminated.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A disc brake comprising:
   a support member attached to a vehicle axially inward of a rotor;
   a caliper mounted on the support member;
   a slide guide mechanism between the caliper and the support member, the slide guide mechanism including a main guide pin guide hole and a sub-guide pin guide hole, and a main guide pin and a sub-guide pin arranged to be received by the respective guide holes, the slide guide mechanism allowing the caliper to move in an axial direction with respect to the rotor;
   the caliper having fluid pressure means which enables an axially inner pad and an axially outer pad to grip the rotor,
   wherein a braking torque generated by the axially inner pad is transmitted to the support member directly and a braking torque generated by the axially outer pad is transmitted to the support member through the caliper and the main guide pin,
   wherein a gap between a surface of the main guide pin and the main guide pin guide hole is smaller than a gap between a surface of the sub-guide pin and the sub-guide pin guide hole,
   wherein the main guide pin is positioned on a rotor run-out side of the slide guide mechanism, and
   wherein the main guide pin extends through a plane of contact of the axially outer pad and the rotor.

2. A disc brake comprising:
   a support member attached to a vehicle axially inward of a rotor;
   a caliper mounted on the support member;
   a slide guide mechanism between the caliper and the support member, the slide guide mechanism including a main guide pin guide hole and a sub-guide pin guide hole, and a main guide pin and a sub-guide pin arranged to be received by the respective guide holes, the slide guide mechanism allowing the caliper to move in an axial direction with respect to the rotor;
   the caliper having fluid pressure means which enables an axially inner pad and an axially outer pad to grip the rotor,
   wherein a braking torque generated by the axially inner pad is transmitted to the support member directly and a braking torque generated by the axially outer pad is transmitted to the support member through the caliper and the main guide pin,
   wherein a gap between a surface of the main guide pin and the main guide pin guide hole is smaller than a gap between a surface of the sub-guide pin and the sub-guide pin guide hole,
   wherein the main guide pin is positioned on a rotor ran-out side of the slide guide mechanism,
   wherein the main guide pin extends through a plane of contact of the axially outer pad and the rotor, and
   wherein the axially outer pad is attached to the caliper, and the main guide pin and the sub-guide pin are disposed radially of the rotor outwardly of the point of attachment of the outer pad to the caliper.

3. A disc brake for a vehicle comprising:
   a rotor having an inner side, an outer side and an edge;
   a support member for attaching the disc brake to the vehicle, the support member having a main guide pin guide hole and a sub-guide pin guide hole;
   a caliper mounted on the support member, and having a claw and a caliper arm, the claw having engagement holes;
   an inner brake pad and an outer brake pad, the outer brake pad having a pair of engagement projections for aligning with engagement holes in the claw;
   a main guide pin attached to the caliper arm, inserted into the main guide pin guide hole and positioned beyond the edge of the rotor;
   a sub-guide pin attached to the caliper arm, inserted into the sub-guide pin guide hole and positioned beyond the edge of the rotor; and
   means for moving the caliper in an axial direction of the rotor, whereby the caliper presses the inner brake pad against the inner side of the rotor, and the claw presses the outer brake pad against the outer side of the rotor,
   wherein the caliper is constrained to move in the axial direction of the rotor by the main guide pin and the sub-guide pin,
   wherein a braking torque is transmitted to the support member through the main guide pin and the sub-guide pin,
   wherein the braking torque includes a braking torque generated by the outer brake pad and transmitted to the support member through the caliper and the main guide pin,
   wherein the main guide pin extends from an inner brake pad side of the rotor through a plane of contact of the outer brake pad and the rotor, and
   wherein a line connecting a center of the main guide pin and a center of the sub-guide pin is perpendicular to a radial direction of the rotor, and is parallel to and further away from a center of the rotor than a line connecting centers of the pair of the engagement holes.

4. The disc brake of claim 3, wherein the main guide pin and the sub-guide pin are perpendicular to a radial direction of the rotor.

5. The disc brake of claim 3, wherein the main guide pin and the sub-guide pin cross over the rotor.

6. The disc brake of claim 3, wherein the main guide pin is positioned on a run-out side of the rotor.

7. The disc brake of claim 3, wherein the means for moving the caliper further comprises a hydraulic cylinder.

8. The disc brake of claim 3, wherein a diameter of the sub-guide pin is smaller than a diameter of the main guide pin.

9. The disc brake of claim 3, wherein the diameter of the sub-guide pin is smaller than a diameter of the sub-guide pin guide hole.

10. The disc brake of claim 3, wherein a rubber bushing is positioned around a portion of the sub-guide pin.

11. The disc brake of claim 3, wherein a first rubber boot is positioned around a neck portion of the sub-guide pin, and a second rubber boot is positioned around a neck portion of the main guide pin.

12. The disc brake of claim 3, wherein a braking torque generated by the inner brake pad is transmitted directly to the support member, and a braking torque generated by the outer brake pad is transmitted to the support member through the caliper, the main guide pin and the sub-guide pin.

13. A disc brake for a vehicle comprising:
a rotor having an inner side, an outer side and an edge;
a support member for attaching the disc brake to the vehicle, the support member having a main guide pin and a sub-guide pin attached thereto;
a caliper mounted on the support member and having a claw and a caliper arm, the claw having engagement holes, the caliper arm having a main guide pin guide hole and a sub-guide pin guide hole;
an inner brake pad and an outer brake pad, the outer brake pad having a pair of engagement projections for aligning with engagement holes in the claw;
force means for moving the caliper in an axial direction of the rotor, whereby the caliper presses the inner brake pad against the inner side of the rotor, and the caliper claw presses the outer brake pad against the outer side of the rotor,
wherein the main guide pin is inserted into the main guide pin guide hole and positioned beyond the edge of the rotor,
wherein the sub-guide pin is inserted into the sub-guide pin guide hole and positioned beyond the edge of the rotor,
wherein the caliper is constrained to move in the axial direction of the rotor by the main guide pin and the sub-guide pin,
wherein a braking torque is transmitted to the support member through the main guide pin and the sub-guide pin,
wherein the braking torque includes a braking torque generated by the outer brake pad and transmitted to the support member through the caliper and the main guide pin,
wherein the main guide pin extends from an inner brake pad side of the rotor through a plane of contact of the outer brake pad and the rotor, and
wherein a line connecting a center of the main guide pin and a center of the sub-guide pin is perpendicular to a radial direction of the rotor, and is parallel to and further away from a center of the rotor than a line connecting centers of the pair of the engagement holes.

14. The disc brake of claim 13, wherein the main guide pin and the sub-guide pin are arranged perpendicular to a radial direction of the rotor.

15. The disc brake of claim 13, wherein the main guide pin and the sub-guide pin cross over the rotor.

16. The disc brake of claim 13, wherein the main guide pin is positioned on a run-out side of the rotor.

17. The disc brake of claim 13, wherein the force means comprises a hydraulic cylinder.

18. The disc brake of claim 13, wherein a diameter of the sub-guide pin is smaller than a diameter of the main guide pin.

19. The disc brake of claim 13, wherein the diameter of the sub-guide pin is smaller than a diameter of the sub-guide pin guide hole.

20. The disc brake of claim 13, wherein a rubber bushing is positioned around a portion of the sub-guide pin.

21. The disc brake of claim 13, wherein a first rubber boot is positioned around a neck portion of the sub-guide pin, and a second rubber boot is positioned around a neck portion of the main guide pin.

22. The disc brake of claim 13, wherein a braking torque generated by the inner brake pad is transmitted directly to the support member, and a braking torque generated by the outer brake pad is transmitted to the support member through the caliper, the main guide pin and the sub-guide pin.

* * * * *